Jan. 24, 1956 M. W. ABBERLEY 2,732,215
POTTERS' LATHES AND CHUCKS
Filed Nov. 30, 1951 2 Sheets-Sheet 1

Inventor
Maurice W. Abberley
By

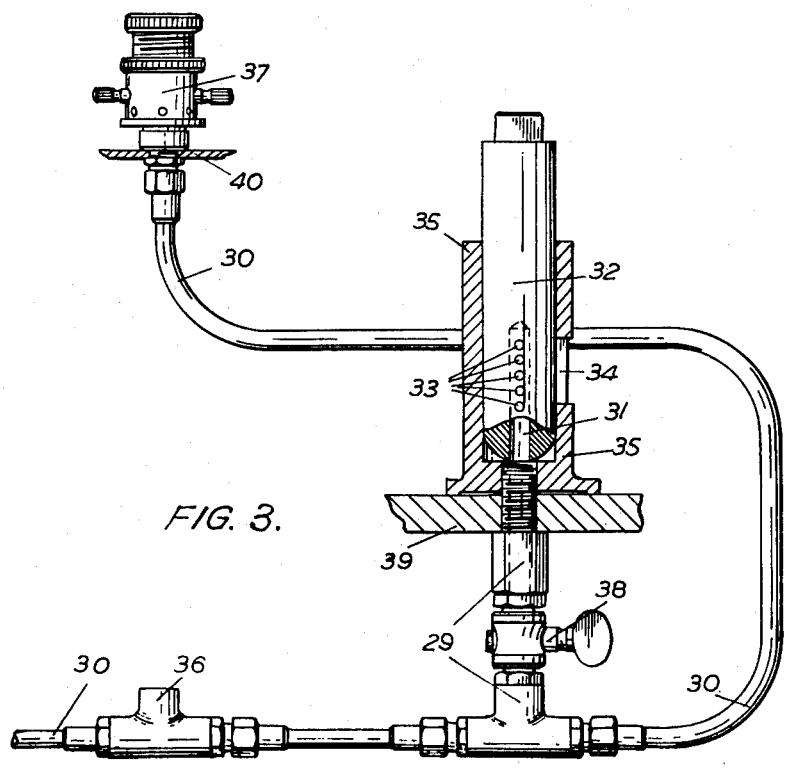

2,732,215
POTTERS' LATHES AND CHUCKS

Maurice W. Abberley, Stoke-on-Trent, England

Application November 30, 1951, Serial No. 259,069

8 Claims. (Cl. 279—3)

This invention relates to potters' lathes and chucks.

The invention is a development from that set forth in U. S. A. Patent No. 2,529,331 in which chucks are set forth for articles having one end substantially closed and the other end open, and comprising means for forming an air seal within the article and means for exhausting the closed cavity thereby obtained.

The object of the present invention is to provide improved means for locating and supporting the article on the chuck, so that notwithstanding the fact that the article may be of the utmost fragility it will be properly supported while being acted upon.

The invention is intended especially for use in connection with a lathe as set forth in the specification of U. S. A. Patent No. 2,586,628, and although it is not intended to confine the present invention to use in conjunction with lathes on those lines nevertheless it is felt that the best results will probably be attained when the two are used in conjunction with each other.

The invention will be described with reference to the accompanying drawings, in which:

Figure 3 is a part sectional elevation showing control mechanism.

Figure 1:
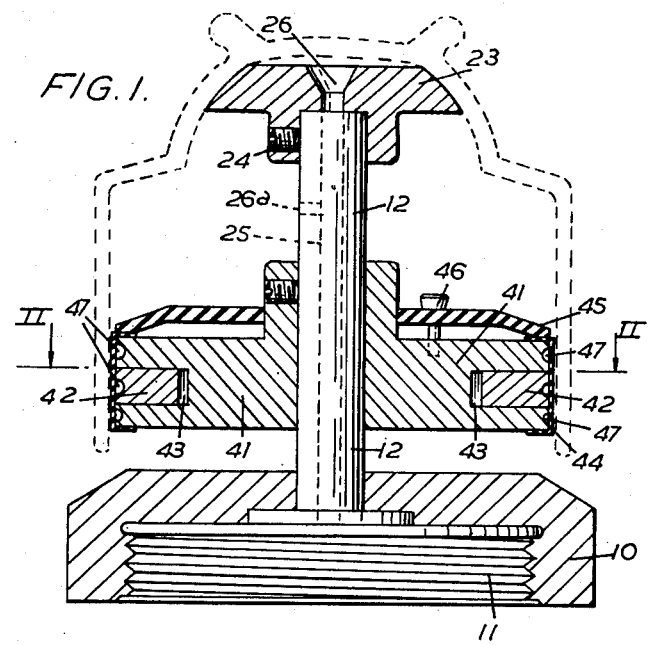
Figure 1 is a sectional elevation of a chuck and Figure 2 a sectional plan on line II—II of Figure 1.
Figure 2:
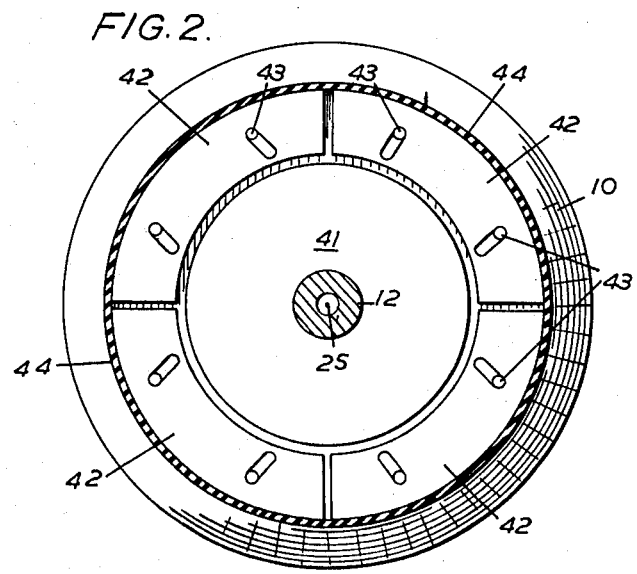

The chuck spindle 12 has attached to it a base 10 which is provided with internal screw threads 11 whereby it may be attached to a head on the lathe or other spindle. Axially down the middle of the chuck spindle is a vacuum duct 25 communicating with a corresponding duct in the lathe spindle leading to a suitable vacuum pump. A rotary valve is provided on the line between the pump and the lathe spindle, opening to atmosphere. At the head or end of the chuck spindle a fixed disc or cap 23 is secured in position by a screw 24. There is a vacuum port 26 through the disc opening on the end face of it. There is another vacuum port 26ᵃ from the same duct below the disc, on the chuck spindle itself. Fixed on the chuck spindle below this port is a further disc or collar 41, which is slotted to receive slotted segments 42, which are held loosely in position by pegs 43, the arrangements being such that when the chuck rotates at working speed the segments 43 move outwards centrifugally beyond the periphery of the disc or collar 41 in which they are carried. Around the disc or collar, completely enclosing the segments, is a rubber or other flexible band or girdle 44. It is distended when the segments move outwards. It is secured in position by adhesive and by clamping members 45, at one or both faces of the disc or collar, which are secured at 46 on to the disc or collar 41 and grip the edges of the rubber band or girdle. Rubber or similar rings may be let into grooves 47, in the periphery of the disc or collar 41 to assist in securing the band or girdle 44 by providing it with a form of anchorage or seating. The chuck is intended for use in connection with workpieces having straight parallel sides. A suitably shaped cup is indicated in dotted lines at Figure 1. In operation the clay cup or the like is first placed on the chuck where it is supported only by the fixed location disc 23 and held lightly by the vacuum action through the disc. The chuck is then caused to rotate at speed, so that the centrifugal weights 42 move outwardly and distend the rubber band 44. Previously this band had been clear of the inside wall of the cup but under the centrifugal action it now makes contact, and centralizes the cup. As the band is brought into close contact with the inside wall of the cup the enclosed cavity within the cup is exhausted by the vacuum action through the port 26ᵃ in the chuck spindle 12. At this stage the rotary valve is closed to atmosphere and the full vacuum is exerted during the operation of the lathe tool or tools. This is achieved as shown in Figure 3. The vacuum duct 25 through the chuck spindle 12 communicates with a corresponding duct in the driving spindle and this in turn communicates through a tube 30 and union 29 with a duct 31 in an element 32 operatively associated with the drive of the machine so that it is caused to make one complete revolution in each cycle of operation. While the chuck is rotating slowly one or more air bleeds 33 in this further duct are exposed to atmosphere through an opening 34 in a fixed shield 35. After the chuck has speeded up the rotation of the element 32 incorporating the said further duct 31 carries these air bleeds under the shield or cover 35 and closes them. The result is that the vacuum effect which is derived from a pump connection at 36 increases substantially to an extent governed by an adjustable leak valve 37 attached to the end of the tube 30. The air bleeds 33 become exposed again as the element 32 nears the end of its cycle. The added vacuum effect therefore ceases before the chuck speed is reduced. The cup can then be removed and a fresh one placed in position. A cock 38 controls the air flow through the union 29. The mechanism is carried by fixed parts 39, 40 of the frame of the machine.

I claim:

1. A chuck for articles having one end substantially closed and the other end open comprising means for forming an air seal within the article, means for exhausting the closed cavity thereby obtained, said seal-forming means being of a resilient character, and associated with said seal-forming means to expand such means radially.

2. A chuck as defined in and claimed by claim 1 further characterized in that said means for expanding said seal-forming means includes elements movable radially due to centrifugal force when the chuck is rotating a high speed.

3. A chuck as defined in and claimed by claim 1 further characterized in that means is provided to support the substantially closed end of the article and that the seal-forming means is an expansible girdle mounted below the said means supporting the substantially closed end of the article.

4. A chuck as defined in and claimed by claim 3 further characterized in that said girdle is mounted adjacent to the open end of the article.

5. A chuck as defined in and claimed by claim 1 further characterized in that the means for expanding the seal-forming means includes a plurality of radially movable weights and the seal-forming means includes an expansible girdle enclosing said weights and movable outwardly when such weights move radially due to centrifugal action when the chuck is rotated a high speed.

6. A chuck for articles of the type having a substantially closed end and open opposite end comprising a rotatable spindle, a fixed support for the substantially closed end of the article carried by the spindle, an annular member mounted on the spindle in spaced relation to the support, a plurality of radially movable weights carried by the said annular member, a flexible girdle surrounding the annular member and bearing against one face of the said weights, the girdle engaging the inner surface of the article adjacent to the open end thereof to provide an air seal between said open end of the article and the substantially closed end of the article, the spindle having a duct therein extending longitudinally thereof, a further duct in the fixed support in communication with the duct in the spindle and with the space between such support and the substantially closed end of the article, a further duct in the spindle arranged perpendicularly to the longitudinally extending duct located intermediate the support and the flexible girdle and in communication with the longitudinally extending duct and the interior of the article between the support and the girdle, means to exhaust air from the interior of the article through said aforementioned ducts, and means to rotate the spindle so that the speed of rotation moves the weights radially outward to expand the girdle into firm engagement with the inner surface of the article.

7. A chuck as defined in and claimed by claim 1 further characterized in that means is provided to apply a relatively light suction to the interior of the article prior to the seal-forming means being expanded radially.

8. A chuck for articles of the type having a substantially closed end and an open opposite end comprising a support for the substantially closed end of the article, a flexible girdle mounted below the said support and adapted to engage the inner surface of the article adjacent the open end thereof to form an air-seal within the article intermediate the article's open end and its substantially closed end, centrifugally acting means within said flexible girdle to expand such girdle into engagement with the inner surface of the article when the chuck is rotated at high speed, and means in communication with the air-seal to remove the air therefrom when the girdle has been expanded into engagement with the inner surface of the article.

References Cited in the file of this patent
UNITED STATES PATENTS

| | | |
|---|---|---|
| 2,425,928 | Emerson | Aug. 19, 1947 |
| 2,481,094 | Edwards | Sept. 6, 1949 |
| 2,519,139 | Keeney | Aug. 15, 1950 |
| 2,529,331 | Ellis et al. | Nov. 7, 1950 |